United States Patent [19]

Therriault et al.

[11] Patent Number: 5,387,466

[45] Date of Patent: Feb. 7, 1995

[54] WATER ABSORBENT PRESSURE SENSITIVE ADHESIVE

[75] Inventors: Donald J. Therriault, York, Pa.; Herbert M. Hand, Sr., Bel Air, Md.

[73] Assignee: Adhesives Research, Inc., Glen Rock, Pa.

[21] Appl. No.: 251,241

[22] Filed: May 31, 1994

Related U.S. Application Data

[63] Continuation-in-part of Ser. No. 114,046, Aug. 31, 1993, abandoned.

[51] Int. Cl.⁶ .......................... C09J 7/02; C08L 33/06
[52] U.S. Cl. .................................. 428/355; 525/227; 525/228; 525/223
[58] Field of Search ....................... 525/223, 227, 228; 428/355

[56] References Cited

U.S. PATENT DOCUMENTS 4,931,347 6/1990 Slovinsky ............................ 428/192
5,266,402 11/1993 Delgado ............................. 428/355

Primary Examiner—James J. Seidleck
Assistant Examiner—I. Zemel

[57] ABSTRACT

A water-absorbent pressure sensitive adhesive composition is provided comprising (a) a continuous phase comprised of a copolymer of a hydrophobic monomer and a hydrophilic monomer, said monomers being present in said copolymer in a weight ratio of from about 50:50 to about 90:10, respectively; and (b) a non-particulate discontinuous phase comprised of domains of a hydrophilic homopolymer or copolymer dispersed throughout said continuous phase.

11 Claims, 3 Drawing Sheets

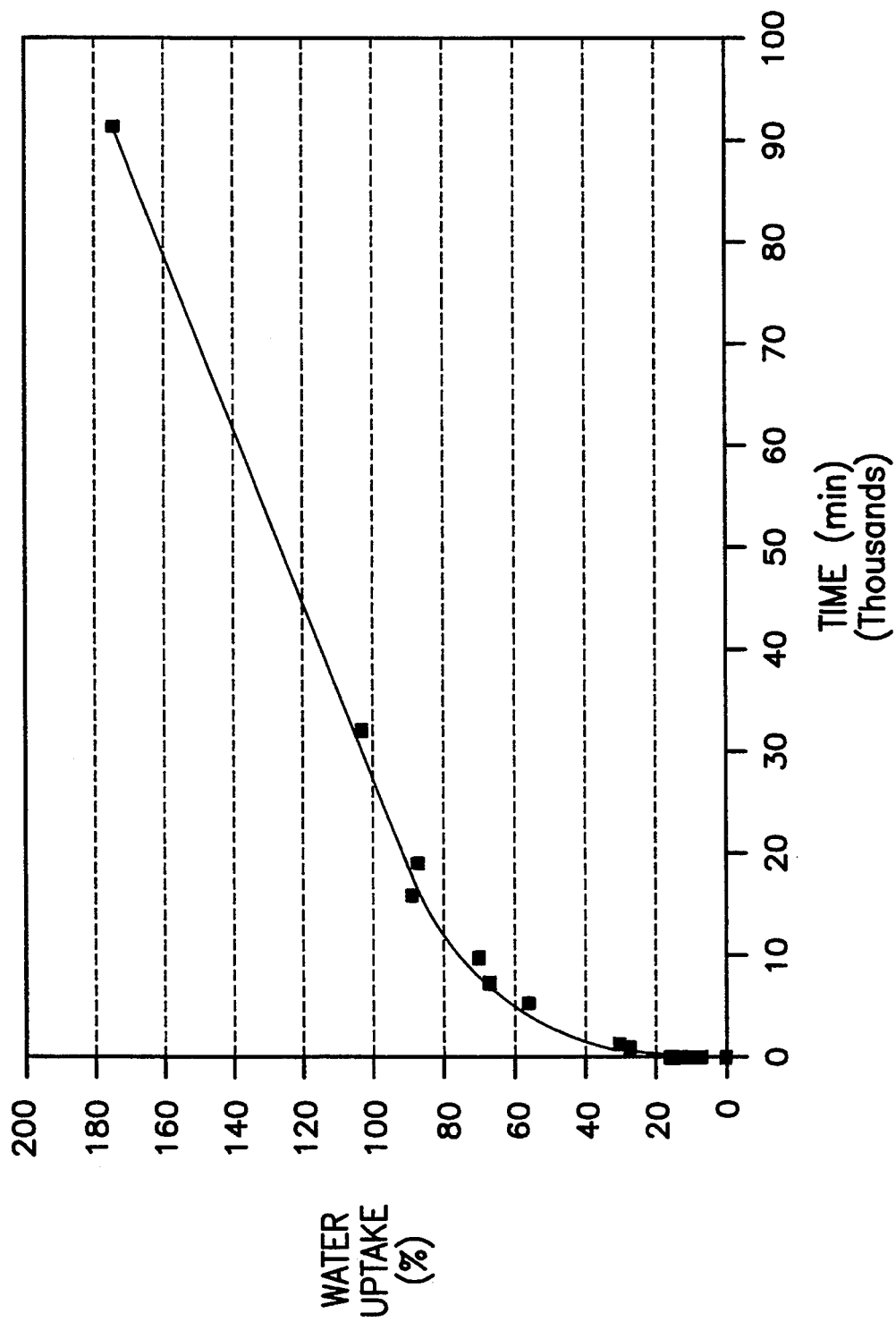

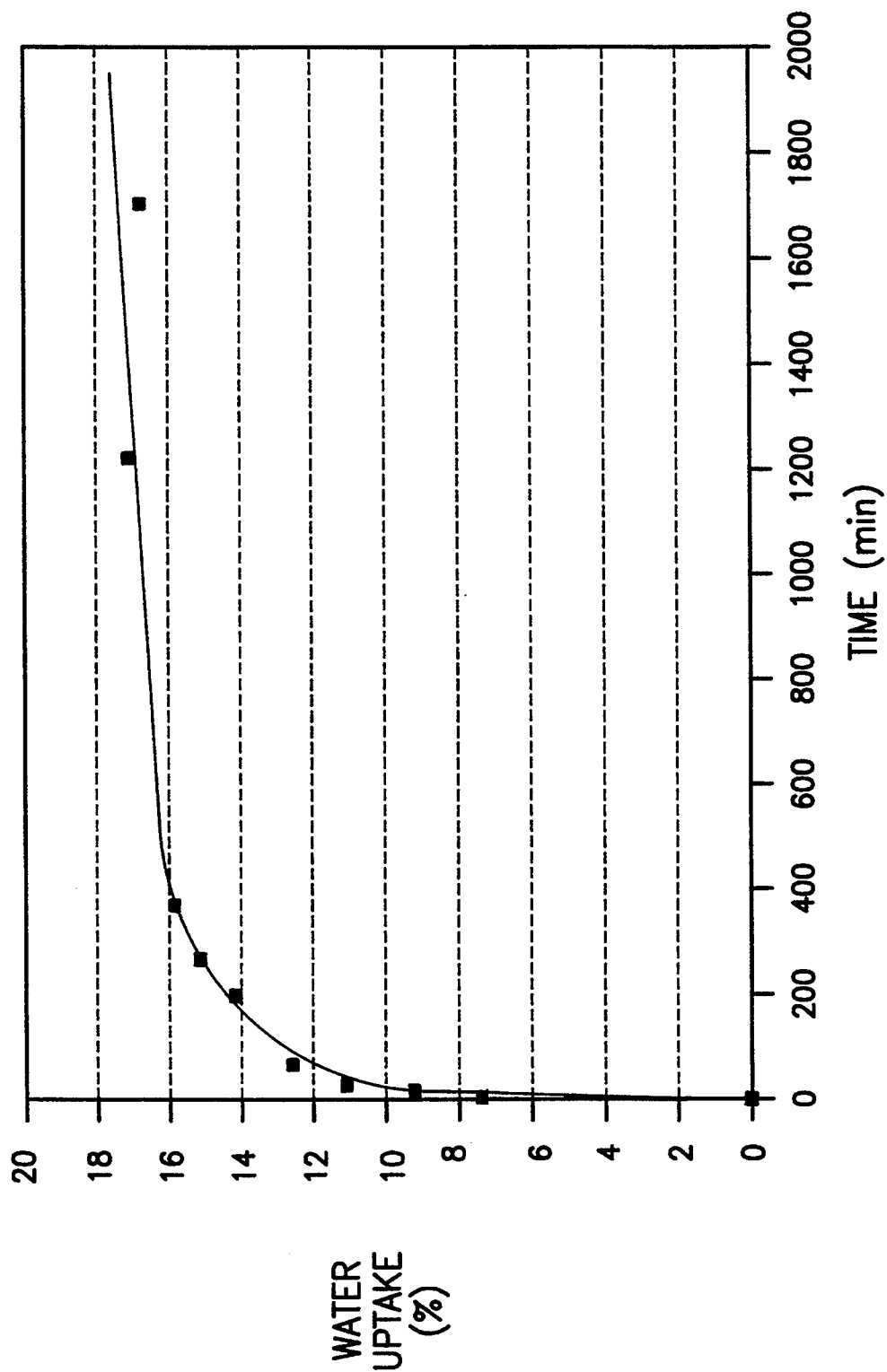

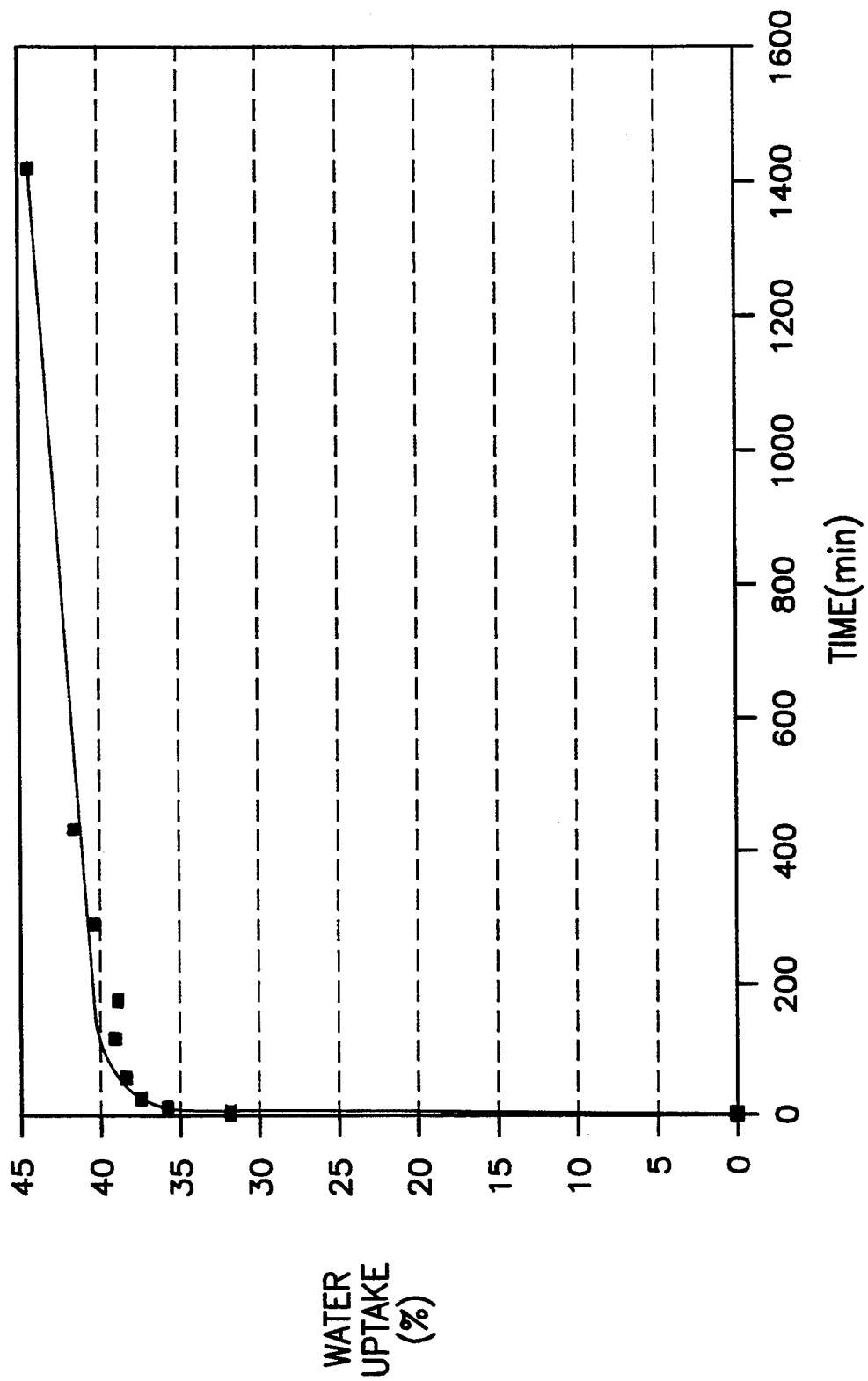

WATER ABSORBENT PRESSURE SENSITIVE ADHESIVE

CROSS-REFERENCE TO RELATED APPLICATIONS

This application is a continuation-in-part application of application Ser. No. 08/114,046, filed Aug. 31, 1993, now abandoned.

BACKGROUND OF THE PRESENT INVENTION

The present invention is directed to a water-absorbent pressure sensitive adhesive.

There is an ongoing need in the medical industry for a pressure sensitive adhesive for long-term skin applications. An adhesive possessing this quality would be ideal for applications in which a patient's skin is wetted as a result of either site preparation or the accumulation of moisture under the adhesive during normal perspiration. This type of system could readily be used for surgical drapes, wound dressings, or other special applications in which durable bonding to fully saturated skin tissue is needed. There has yet to be an effective adhesive product to meet these demanding needs.

To meet the criteria described above, an adhesive must possess certain inherent qualities that are related to the chemistry of the adhesive. The design of such an adhesive should include a balance of moisture absorbent capabilities and adequate pressure sensitive adhesive properties. First, hydrophilic character will enable the adhesive to interact with moisture and free up bonding sites at the adhesive/skin interface. Advantageously, not only will such an adhesive system readily absorb moisture at the skin-adhesive interface, but the adhesive will also serve as an effective vehicle to transport absorbed moisture in the form of water vapor from the adhesive to the ambient environment. This will allow for intimate contact of the adhesive with the skin. Secondly, hydrophobic character will enable the adhesive to exhibit the mechanical properties needed for initial, and durable, bonding to skin. Reactive monomers—in which the homopolymers have thermal glass transition temperatures that are well below ambient—usually possess the tack required for pressure sensitive adhesive bonding. Subsequent cross linking may provide the required durability needed for long term wear.

Consideration must also be given to the safety of the adhesive. The adhesive must be non-toxic if it is to be used for medical purposes. This is especially true when bond sites are near open wounds or abrasions. An ideal long-term wound care adhesive should contain no extractables such as unreacted monomers, additives, or soluble polymeric systems. Such extractables could break down when exposed to solvents such as water. Absorption into skin, or migration to the open wound, may produce harmful effects to the patient. Therefore, it is important for the adhesive to maintain chemical integrity throughout its use.

The mechanical properties of a desirable long-term skin or wound-care adhesive are intimately related to its composition. An ideal candidate must maintain an aggressive adhesive nature throughout its use. This includes not only the short term needs of the consumer, but the adhesive must be durable after long-term storage. In ambient environments, an adhesive might see a wide range of temperature cycles over extended periods of time. Subsequent chemical changes caused by reactions, such as further crosslinking or degradation, may weaken the pressure-sensitive qualities of the adhesive system.

OBJECTS AND SUMMARY OF THE PRESENT INVENTION

It is accordingly an object of the present invention to provide a pressure sensitive adhesive exhibiting enhanced adhesive properties in the presence of moisture.

It is further an object of the present invention to provide a pressure sensitive adhesive exhibiting enhanced water vapor transmission properties.

It is still further an object of the present invention to provide a pressure sensitive adhesive exhibiting long-term stability in the presence of moisture.

In accordance with the present invention, there is thus provided a pressure sensitive adhesive comprised of a continuous phase and a non-particulate discontinuous phase, said continuous phase comprising a copolymer formed of a hydrophilic monomer and a hydrophobic monomer, and said discontinuous phase comprising domains of a hydrophilic homopolymer or copolymer dispersed within said continuous phase.

BRIEF DESCRIPTION OF THE DRAWINGS

FIG. 1 is a water-absorption plot for a pressure sensitive adhesive of the present invention.

FIGS. 2 and 3 are water-absorption plots for comparative pressure sensitive adhesives of the prior art.

DETAILED DESCRIPTION OF THE INVENTION

The pressure sensitive adhesive of the present invention is comprised of a continuous phase and a discontinuous phase dispersed throughout the continuous phase, with the properties of each phase acting in concert to enable the adhesive composition to exhibit acceptable adhesive properties in the presence of moisture. This characteristic is due to the ability of the adhesive to both transport moisture from the interface between the adhesive and the substrate by absorption and to transport moisture (in the form of water vapor) through the adhesive layer to the atmosphere once absorbed.

The continuous phase is formed of monomer types A and B, with one type of monomer being hydrophobic (monomer A) and one type of monomer being hydrophilic (monomer B).

The A and B monomers are present in the continuous phase in a weight ratio of from about 90:10 to about 50:50, respectively, and most preferably in a weight ratio of from 70:30 to 60:40.

The continuous phase is preferably a copolymer of an acrylic or methacrylic acid ester of a non-tertiary alcohol (monomer A) and a copolymerizable polar monomer (monomer B).

More specifically, monomer type A is preferably a monomeric acrylic or methacrylic acid ester of a non-tertiary alcohol, with the alcohol having from 1 to 14 carbon atoms, with the average number of carbon atoms being from 4 to 12. Examples of such A monomers include but are not limited to the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, and 1-dodecanol. Exemplary A monomers include but are not limited to nonhydroxy moiety-containing alkyl acrylates and methacrylates such as methyl acrylate/methacrylate, ethyl acrylate/methacrylate, n-propyl acrylate/methacrylate, isopropyl acrylate/methacrylate, n-butyl acrylate/methacrylate, isobutyl acrylate/methacrylate, sec-butyl acrylate/methacrylate, t-butyl acrylate/methacrylate, n-pentyl acrylate/methacrylate, n-hexyl acrylate/methacrylate, cyclohexyl acrylate/methacrylate, n-octyl acrylate/methacrylate, 2-ethylhexyl acrylate/methacrylate, etc.

The type B monomer is a polar (hydrophilic) monomer and is copolymerizable with the A monomer. Exemplary B monomers include but are not limited to ethylenically unsaturated carboxylic acid monomers (such as acrylic acid, methacrylic acid, itaconic acid, crotonic acid, maleic acid, cinnamic acid, etc.), lower hydroxyalkyl esters of ethylenically unsaturated carboxylic acids wherein the alkyl group has from 1 to 8 carbon atoms (such as hydroxyethyl acrylate, hydroxypropyl acrylate, hydroxyethyl methacrylate, hydroxypropyl methacrylate, etc.), acrylamide, methacrylamide, acrylonitrile, and methacrylonitrile.

Copolymers of suitable hydrophobic and hydrophilic monomers are known in the art as shown, for example, in European patent application No. 501,124, published Sep. 2, 1992.

The discontinuous phase of the pressure sensitive composition comprises a hydrophilic homopolymer or copolymer. The discontinuous phase is in the form of separately-formedy non-particulate discrete domains of the hydrophilic homopolymer or copolymer dispersed throughout the continuous phase.

The hydrophilic homopolymer or copolymer used to form the discontinuous phase comprises either a homopolymer of the above-described B type monomer (in a preferred embodiment), or a copolymer containing in major proportion the B type monomer as one of the polymerized monomers in order to render the copolymer hydrophilic in character. That is, the discontinuous phase may comprise a copolymer of a hydrophilic monomer B and a hydrophobic monomer, such as monomer type A. In an embodiment where the discontinuous phase comprises a copolymer of A and B type monomers, the hydrophilic monomer B is present in a weight ratio of monomer B:monomer A of at least 50:50, and preferably at least 65:35, to ensure that the copolymer exhibits the desired hydrophilic properties.

Monomer B of the discontinuous phase is preferably one or more of a lower hydroxyalkyl ester of ethylenically unsaturated carboxylic acids wherein the alkyl group has from 1 to 8 carbon atoms (such as hydroxyethyl acrylate, hydroxypropyl acrylate, hydroxyethyl methacrylate, hydroxypropyl methacrylate, etc.), with the discontinuous phase must preferably being comprised solely of hydroxyethyl acrylate monomer.

The continuous phase of the adhesive composition of the present invention may be formed by conventional solution polymerization techniques in which the monomers are mixed (together with initiator) and caused to copolymerize under inert atmosphere under conventional polymerization conditions.

The discontinuous phase of the adhesive composition of the present invention is formed subsequent to formation of the continuous phase, preferably by slow or metered addition of the discontinous phase monomer(s) together with a polymerization initiator to the continuous phase under polymerization conditions. The discontinuous phase is preferably formed separately from the continuous phase in order to ensure formation of the discontinuous phase within the previously-formed continuous phase in the form of domains dispersed throughout the continuous phase. The polymerization reaction is permitted to continue for a time sufficient to permit substantially complete reaction of the added monomers, thus forming a heterogeneous polymerization product comprised of a discontinuous phase dispersed within the continuous phase. The heterogeneous product ranges in appearance from translucent to opaque in character, depending upon the amount of the discontinuous phase polymer which is ultimately formed.

The discontinuous phase comprises from about 10 to about 50 percent by weight of the adhesive composition. Preferably, the discontinuous phase comprises from about 15 to 50 percent by weight of the adhesive composition. As the amount of discontinuous phase increases, the appearance of the composition will change from translucent to opaque.

The resulting adhesive may be used in solution form. Preferably, the adhesive is applied to a backing material (such as a tape) in solution form, with the solvent being removed upon application to the tape. The adhesive is applied in a thickness sufficient to provide the desired adhesion together with the desired degree of water absorption. Suitable adhesive layer thicknesses range from a few microns to 5 mm or so.

Exemplary backing materials include but are not limited to flexible and inflexible backing materials conventionally employed in the area of pressure sensitive adhesives, such as creped paper, kraft paper, fabrics (knits, non-wovens, wovens), foil and synthetic polymer films such as polyethylene, polypropylene, polyvinyl chloride, poly(ethylene terephthalate) and cellulose acetate, as well as glass, ceramics, metallized polymer films and other compatible sheet or tape materials. Advantageously, the backing material is permeable to water vapor to enhance the water vapor transmission rate through the material and exhibits water absorbent properties.

The backing material may be of any desired shape and configuration, such as adhesive tapes, strips, wound dressings, surgical drapes, etc. It may be desirable to include a dressing or absorbent pad attached to the adhesive surface. Such materials may be coated in any conventional manner with the adhesive composition of the present invention, such as by roll coating, spray coating, extrusion coating, co-extrusion coating, hot melt coating by use of conventional coating devices. When appropriate, the composition of the present invention may be applied as a solution and the solvent subsequently removed to leave a tacky adhesive residue on the backing material.

The invention is illustrated by the following examples which are intended to be merely exemplary of the invention and not deemed to be limiting as to the scope of the invention.

EXAMPLE

In this example, a water-absorbent pressure sensitive adhesive is prepared in accordance with the present invention.

The water absorbent pressure sensitive adhesive of this example was prepared with constant stirring, under nitrogen atmosphere, and using a reaction temperature range of 158° F.–200° F. by the following reaction sequence:

(1) Formation of continuous phase: The reactor was charged with 1700 grams of a solution containing 19.05% 2-hydroxyethyl acrylate, 34.93% 2-ethylhexl acrylate, 0.97% isobutoxymethyl acrylamide (as cross-linking agent), 40.45% ethyl acetate and 4.48% isopropanol (as solvents), and 0.11% Vazo 67 (a DuPont free radical initiator). The reactor was heated to 158° F. and the monomers allowed to react. When the exotherm subsided, 4272.6 grams of the same solution was added over a one hour period. The total reaction mixture was then allowed to continue reacting for an additional 30 minutes.

(2) Formation of discontinuous phase: 1034.1 grams of a solution containing 55.02% 2-hydroxyethyl acrylate, 40.42% ethyl acetate, 4.45% isopropanol, and 0.11% Vazo 67 were then added to the reactor containing the previously-formed continuous phase by metering over a three hour period. The total mixture was then allowed to react for an additional 1.5 hours. The finished reaction product was then cooled, and discharged from the reactor. The resulting polymer had a pearlescent white appearance indicating that a second discontinuous phase was present.

The polymer film (having pressure sensitive adhesive properties) had absorption characteristics represented by the water absorption plot in FIG. 1. The polymer is shown to absorb moisture between 80% and 90% of its weight within 14 days, and ultimately >170% over a 60 day immersion period. The shape of the curve indicates that equilibrium has not yet been established, and that water absorption continues. The resulting product was shelf-stable and remained opaque indefinitely, confirming the formation of an intimately bound discontinuous phase within the continuous phase.

COMPARATIVE EXAMPLE A

In this comparative example, a separate preparation was conducted involving the reaction of monomers at a temperature range of 158° F.–200° F., under nitrogen atmosphere, and with constant stirring.

A reactor was charged with 2100 grams of a solution consisting of 24.60% 2-hydroxyethyl acrylate, 24.60% 2-ethylhexyl acrylate, 0.75% isobutoxymethyl acrylamide, 44.95% ethyl acetate 4.99% isopropanol, and 0.11% Vazo 67. The mixture was allowed to exotherm for about 10 minutes. When the exotherm was stabilized, 4900 grams of the same monomer/solvent solution was added over four hours. The total reaction mixture was reacted for an additional hour, cooled, then discharged. The resulting polymer had little or no discontinuous phase as evidenced by the fact that the polymer was only slightly cloudy and thus appeared to be a single phase solution.

The polymer film had moisture absorption characteristics represented by the plot shown in FIG. 2. In general, this polymer absorbed moisture up to 17% over a period of 1.4 days. The plot suggests that the moisture capacity is limited by the homogeneous polymer network created by this reaction.

COMPARATIVE EXAMPLE B

In this comparative example, a comparative pressure sensitive adhesive product was prepared similar to that of Comparative Example A with the exception that the amount of the hydrophilic monomer B which is present is increased in an attempt to render the resulting continuous phase copolymer more hydrophilic by nature and increase the water absorbent properties of the composition.

This additional preparation involved the reaction of monomers—under constant stirring and nitrogen atmosphere—at a temperature range of 158° F.–200° F.

A reactor was charged with 2100 grams of a solution containing 34.44% 2-hydroxyethyl acrylate, 14.76% 2-ethylhexyl acrylate, 0.75% isobutoxymethyl acrylamide, 44.95% ethyl acetate, 4.99% isopropanol, and 0.11% Vazo 67. The mixture was allowed to exotherm for about 10 minutes. When the exotherm had stabilized, 4900 grams of the same monomer/solvent solution was added over four hours. The total mixture was reacted for an additional hour, cooled, then discharged. The resulting solution had an opaque white appearance. However, the resulting product became clear upon standing for a few days.

The resulting polymer composition exhibited moisture absorption characteristics represented by the plot shown in FIG. 3. In general this polymer exhibited rapid moisture uptake over a period of time shorter than that exhibited by the composition of Comparative Example A. The polymer absorbed >40% of its weight in water after a 1 day period. The plot of FIG. 3 suggests that the moisture capacity of the polymer is near equilibrium.

A comparison of the absorption results shown in the FIGS. 1–3 indicates that the pressure sensitive adhesives of Comparative Examples A and B are water absorbent, but the water absorbent ability of such compositions is exhausted relatively readily upon contact with water. This phenomena is evidenced by the fact that the absorption curves of FIGS. 2 and 3 level off rather rapidly, after which the rate of water absorption is minimal. By contrast, FIG. 1 shows that the composition of the present invention (having a hydrophilic discontinuous phase) exhibits greatly enhanced water absorbency, with the water absorbency increasing over time and in magnitude in comparison to the compositions of Comparative Examples A and B.

What is claimed is:

1. A water-absorbent and water-permeable pressure sensitive adhesive composition comprising:
   (a) a continuous phase comprised of a copolymer of a hydrophobic monomer and a hydrophilic monomer, said monomers being present in said copolymer in a weight ratio of from about 50:50 to about 90:10, respectively; and
   (b) a non-particulate discontinuous phase comprised of domains of a hydrophilic homopolymer or a copolymer of a hydrophilic monomer and a hydrophobic monomer with said hydrophilic monomer being present in said copolymer in a weight ratio of hydrophilic:hydrophobic monomer of at least 50:50, said domains being dispersed throughout said continuous phase and said discontinuous phase being present in said composition in an amount of at least about 10 percent by weight, based on the total weight of the continuous and discontinuous phases.

2. The composition of claim 1 wherein said discontinuous phase is present in an amount in the range of from about 10 to about 50 percent by weight.

3. The composition of claim 1 wherein said hydrophobic monomer is an acrylic or methacrylic acid ester of a non-tertiary alcohol.

4. The composition of claim 1 wherein said hydrophobic monomer is selected from the group consisting of ethylenically unsaturated carboxylic acid monomers, lower hydroxyalkyl esters of ethylenically unsaturated carboxylic acids, acrylamide, methacrylamide, acrylonitrile and methacrylonitrile.

5. The composition of claim 1 wherein said discontinuous phase comprises a hydrophilic homopolymer.

6. The composition of claim 5 wherein said hydrophilic homopolymer comprises a homopolymer of a lower hydroxyalkyl ester of an ethylenically unsaturated carboxylic acid.

7. The composition of claim 6 wherein said hydrophilic homopolymer is comprised of hydroxyethyl acrylate monomer.

8. The composition of claim 1 wherein said discontinuous phase is comprised of a copolymer of a hydrophilic monomer and a hydrophobic monomer and the weight ratio of hydrophilic:hydrophobic monomers in said copolymer of said discontinuous phase is at least 65:35, respectively.

9. The composition of claim 1 wherein said hydrophobic monomer and said hydrophilic monomer are present in said continuous phase in a weight ratio of from 70:30 to 60:40, respectively.

10. An adhesive-backed tape wherein said adhesive is comprised of the pressure sensitive adhesive of claim 1.

11. An adhesive-backed sheet wherein said adhesive is comprised of the pressure sensitive adhesive of claim 1.

* * * * *

UNITED STATES PATENT AND TRADEMARK OFFICE
CERTIFICATE OF CORRECTION

PATENT NO. : 5,387,466

DATED : February 7, 1995

INVENTOR(S) : DONALD J. THERRIAULT ET AL.

It is certified that error appears in the above-identified patent and that said Letters Patent is hereby corrected as shown below:

Col. 7, Claim 4, lines 1 and 2 of the claim, "hydrophobic" should read --hydrophilic--.

Signed and Sealed this

Twenty-eight Day of March, 1995

*Attest:*

BRUCE LEHMAN

*Attesting Officer*　　　*Commissioner of Patents and Trademarks*